July 16, 1968     B. R. HOLLANDER     3,393,399
WIRE CONNECTORS
Filed Oct. 22, 1965
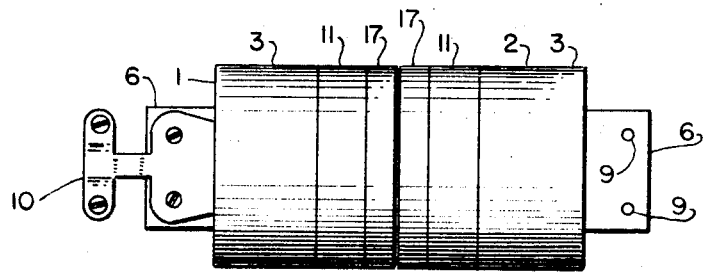
FIG. 1
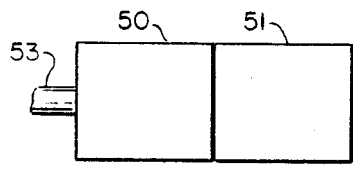
FIG. 2
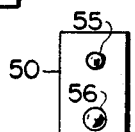
FIG. 3A
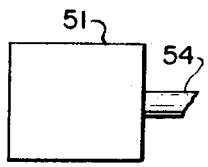
FIG. 3B
FIG. 4
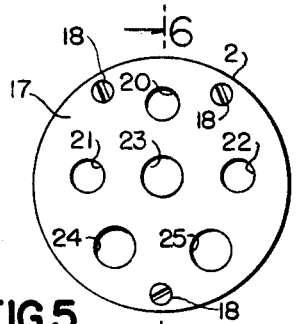
FIG. 5
FIG. 6
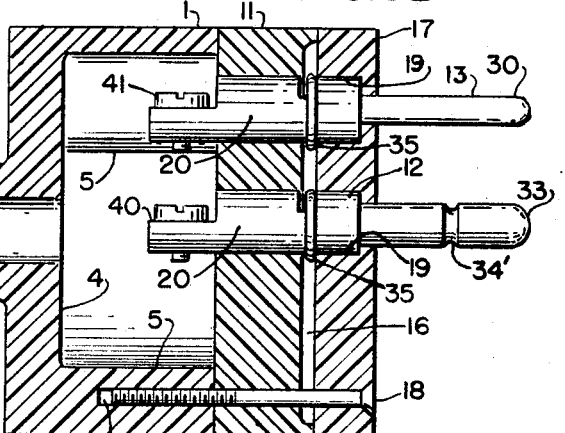
FIG. 7
FIG. 10
FIG. 8    FIG. 9
FIG. 13
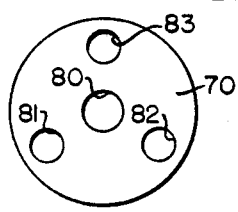
FIG. 11
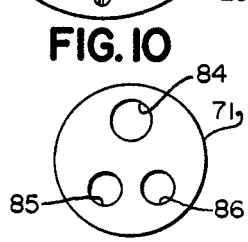
FIG. 12
INVENTOR:
BETTY R. HOLLANDER

United States Patent Office 3,393,399
Patented July 16, 1968

3,393,399
WIRE CONNECTORS
Betty R. Hollander, Stamford, Conn., assignor to Omega Engineering, Inc., a corporation of New Jersey
Filed Oct. 22, 1965, Ser. No. 500,834
2 Claims. (Cl. 339—176)

ABSTRACT OF THE DISCLOSURE

A connector for multiconductor thermocouple cables comprising a first connector base having at least three spaced sockets of different metals where one socket is of a different diameter, and a second connector base having at least two pins of different metals where one pin is of a different diameter.

This invention relates in general to electrical plug type connectors and, more particularly, to plug type connectors for thermocouple wires having more than two conductors.

Thermocouples are pairs of wires of dissimilar metals connected at both ends. When the junctions at both ends are subjected to different temperatures, an electric potential is set up between them. This electro motive force (EMF) is directly proportional to the temperature difference so that an EMF measuring instrument placed in the circuit will be used to indicate the temperature of one junction if the temperature of the other is known. The temperature measuring junction is often placed in a protective tube or probe.

Thermocouple lead wire which is used to connect the thermocouple to the instrument is made of two conductors of metals similar to the thermocouple. It is often convenient to be able quickly to disconnect the thermocouple extension wire near the probe or at the measuring apparatus. It is also often convenient to vary the pair of lead wires so as to be compatible with different thermocouples.

It is, therefore, an object of this invention to provide connectors for multiconductor thermocouple wire. These same connectors also allow a standard two wire thermocouple connector to be connected to any desired pair of thermocouple wires.

Many other objects, advantages and features of invention reside in the construction, combination, and arrangement of parts involved in the embodiments of this invention and its practice as will be understood from the following description and accompanying drawing wherein:

FIGURE 1 is a top view of a pair of joined thermocouple connectors according to a first embodiment of this invention, one connector having a cable clamp attached thereto;

FIGURE 2 is a side view of a pair of joined conventional male and female two wire thermocouple connectors;

FIGURES 3A and 3B are side views of the disengaged male and female parts of the connector of FIGURE 2;

FIGURE 4 is an end view of the connector shown in FIGURE 3A;

FIGURE 5 is an end view of the female connector shown in FIGURE 1;

FIGURE 6 is a section taken on line 6—6 of FIGURE 5 with male pins or plugs substituted for the receptacles;

FIGURE 7 is an end view of the base of a connector;

FIGURE 8 is a side view of a receptacle as used in the female connector of FIGURE 1;

FIGURE 9 is a front view of a retaining spring used to secure receptacles and plugs in the connectors;

FIGURE 10 is an end view of the female connector of FIGURE 1 with the possible connections which may be made with a male two wire connector being shown in dotted lines; and FIGURES 11, 12 and 13 are end views of female multiconductor thermocouple wire connectors showing modifications of my invention.

Referring to the drawing in detail, FIGURES 1, 5, 6, 7, 8, 9 and 10 show the first embodiment of my invention. A male connector 1 and a female connector 2 are shown joined together in FIGURE 1 to connect a six strand thermocouple wire (not shown). Each connector 1 and 2 has a base 3 containing a central opening 4. Disposed within the opening 4 are the three bosses 5 each containing a tapped aperture 6′. A rectangular lug 6 extends rearward from the base 3. Lug 6 contains a passage 8 for fire which extends through lug 6 into opening 4. Apertures 9 are provided in the lug 6 to enable a cable clamp 10 or any other suitable sitting to be fixed to a connector.

A center section 11 extends over opening 4 of base 3. The center section 11 contains apertures which snugly contain the bodies 20 of the plugs 12 and 13 and the receptacles 14 and 15. The front surface of center section 11 contains a shallow indentation 16.

A cap 17 is secured over the center section 11 by screws 18 which are screwed into the tapped apertures 6′. The cap 17 contains apertures 19 which receive the front ends of the bodies 20 of the plugs 12 and 13 or the receptacles 14 and 15. Extending coaxially with the apertures 19 through the front surface of the cap 17 are six apertures 20, 21, 22, 23, 24 and 25. Since the connector 1 is male, the plugs 12 and 13 are secured in the apertures 19. The plugs 12 are negative and are, for example, made from constantan, Alumel, and alloy #11. The plugs 13 are positive and are, for example, made from Chromel, iron and copper. Since the connector 2 is female, the receptacles 14 and 15 of the aforementioned metals are secured in apertures 19 so that each receptacle 14 or 15 corresponds with a plug 12 or 13.

The positive plugs 13 have tips 30 ⅝″ long which extend ½″ beyond cap 17. These tips 30 are between .136″ to .162″ in diameter with a rounded end. Corresponding receptacles 14, each containing an aperture 31 to receive a tip 30, are placed in female connector 2. The negative plugs 12 have tips 33 which are also ⅝″ long and extend ½″ from the front of cap 17. Tips 33 contain a circumferential groove 34′ near their rounded ends. The tips 33 are between .167″ and .192″ in diameter. Corresponding receptacles 15 each contain an aperture 34 to receive a tip 33.

Springs 35 each have a curved portion 36 which extends partially around the body 20 of a plug 12 or 13 or a receptacle 14 or 15. A straight portion 37 of spring 35 extends into a slot 38 formed transversely across each body 20. Since a spring 35 extends beyond each body 20 within the shallow indentation 16, the springs 35 lock the bodies 20 in place longitudinally within the connectors 1 and 2. In addition, the straight portion 37 of each spring 35 extending into a slot 38 of a receptacle 14 or 15 also extends into an aperture 31 or 34. Thus the straight portion 37 of spring 35 is deflected outward when a plug is inserted into a receptacle. The tips 33 contain circumferential grooves 34′, the springs 35 do not seat in the grooves 34′ as the grooves are used to identify the negative pins. Extending from the rear of each body 20 is a flat portion 40 into which a screw 41 is turned to secure a thermocouple wire. Base 3, center section 11, and cap 17 may be made of any suitable insulating material such as nylon or ceramic or condensation resins and with flat as well as round sides.

FIGURES 2, 3A, 3B and 4 show conventional two conductor thermocouple connectors 50 and 51 entered by the two conductor containing cables 53 and 54. Positive tip 55 and negative tip 56 enter corresponding receptacles (not shown). These tips and receptacles are of the dimensions set forth for the first embodiment of this invention. Both the tips 55 and 56 and the corresponding receptacles are spaced apart 7/16" center to center.

Referring now to FIGURES 5 and 10, apertures 20, 21 and 22 have iron, Chromel and copper receptacles 14 behind them. Apertures 23, 24 and 25 have constantan, Alumel and alloy #11 receptacles behind them. Thus, as shown in FIGURE 10, a two wire male connector 50 having a tip 55 of Chromel and a tip 56 of Alumel may be inserted as indicated at 60 through apertures 21 and 24. In a like manner a connector 50 of Chromel and constantan could be inserted at 61, one of iron and constantan at 62, one of constantan and copper at 63, and one of copper and alloy #11 at 64. In a like manner, a male connector 1 may be used with a single standard female connector 51.

Thus the connectors 1 and 2 may be used to join six thermocouple wires, or they may be used in connection with standard two wire connectors to connect desired pairs of thermocouple wires. The best configuration in a cylindrical connector places aperture 23 slightly above the center of cap 17 with aperture 20 located, center to center, 7/16" above it. Apertures 21 and 22 are placed 7/16" on each side of aperture 23. Apertures 24 and 25 are located 7/16" from apertures 21 and 22, respectively, and they are located about 5/32" inward toward the center of cap 17. This particular arrangement insures the proper mating of connectors 1 and 2 and also allows standard connectors 50 and 51 to be used in the manner which has been described.

FIGURES 11, 12 and 13 show ends caps 70, 71 and 72 of three modified connectors according to this invention. Plugs or receptacles of constantan are behind aperture 80 and of Chromel, iron and copper behind apertures 81, 82 and 83. Apertures 81, 82 and 83 are 7/16" from aperture 80 to accommodate a conventional connector 50 or 51. End cap 71 contains openings 84, 85 and 86. Plugs or receptacles of copper are mounted behind aperture 84, and of alloy #11 and constantan behind apertures 85 and 86. End cap 72 contains apertures 87, 88 and 89. Plugs or receptacles of constantan are mounted behind aperture 87 and of iron and copper behind apertures 88 and 89. Apertures 85 and 86 are 7/16" from aperture 84 and apertures 88 and 89 are 7/16" from opening 87 to accommodate a standard connector 50 or 51. Many other combinations of metals may be set up to satisfy particular needs.

While I have shown and described my invention in the best form known to me, it will nevertheless be understood that this is purely exemplary and that modifications may be made in the construction, combination and arrangement of parts involved in the invention without departing from the spirit thereof except as it may be more limited in the appended claims wherein I claim:

1. A pair of wire connectors for multiconductor thermocouple cables comprising in combination:
   (a) a first connector base provided with at least three spaced female pin sockets, each of a metal different from the others, and in which at least one of said sockets is of different diameter from the other sockets; and
   (b) a second connector base provided with at least two pins of different diameter adapted to engage simultaneously at least two of said sockets, said pins being of metals different from each other and engagable only in sockets having metals corresponding to the metals of said pins.

2. A pair of wire connectors for multiconductor thermocouple cables comprising in combination:
   (a) a first connector base provided with at least three spaced pins, each of a metal different from the others, and in which at least one of said pins is of different diameter from the other pins; and
   (b) a second connector base provided with at least two sockets of different diameter adapted to engage simultaneously at least two of said pins, said sockets being of metals different from each other and engageable only upon pins corresponding to the metals of said sockets.

References Cited

UNITED STATES PATENTS

| | | |
|---|---|---|
| 3,046,516 | 7/1962 | Tymkewicz. |
| 3,149,264 | 9/1964 | Richards _____ 339—189 X |
| 3,179,915 | 4/1965 | Klassen. |
| 3,181,105 | 4/1965 | Roach et al. _____ 339—94 |

FOREIGN PATENTS

| | | |
|---|---|---|
| 950,808 | 3/1949 | France. |
| 484,005 | 4/1938 | Great Britain. |

MARVIN A. CHAMPION, *Primary Examiner.*

JOHN R. MOSES, *Assistant Examiner.*